United States Patent
Yang

(10) Patent No.: US 10,611,947 B2
(45) Date of Patent: Apr. 7, 2020

(54) ELECTRICALLY CONDUCTIVE OIL-BASED FLUIDS

(71) Applicant: BAKER HUGHES INCORPORATED, Houston, TX (US)

(72) Inventor: Jianzhong Yang, Missouri City, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/581,115

(22) Filed: Apr. 28, 2017

(65) Prior Publication Data

US 2017/0233632 A1 Aug. 17, 2017

Related U.S. Application Data

(62) Division of application No. 14/804,596, filed on Jul. 21, 2015, now Pat. No. 9,637,674.

(60) Provisional application No. 62/027,008, filed on Jul. 21, 2014.

(51) Int. Cl.

| C09K 8/32 | (2006.01) |
| C09K 8/82 | (2006.01) |
| C09K 8/64 | (2006.01) |
| E21B 21/00 | (2006.01) |
| E21B 43/16 | (2006.01) |
| E21B 43/25 | (2006.01) |

(52) U.S. Cl.
CPC ............. *C09K 8/32* (2013.01); *C09K 8/64* (2013.01); *C09K 8/82* (2013.01); *E21B 21/00* (2013.01); *E21B 43/16* (2013.01); *E21B 43/25* (2013.01)

(58) Field of Classification Search
None
See application file for complete search history.

(56) References Cited

U.S. PATENT DOCUMENTS

| 5,826,669 | A | * | 10/1998 | Zaleski | C09K 8/14 175/72 |
| 5,990,050 | A | | 11/1999 | Patel | |
| 6,006,831 | A | | 12/1999 | Schlemmer et al. | |
| 6,308,788 | B1 | | 10/2001 | Patel et al. | |
| 6,525,003 | B2 | | 2/2003 | Schlemmer et al. | |
| 6,608,005 | B2 | | 8/2003 | Palmer et al. | |
| 6,691,805 | B2 | | 2/2004 | Thaemlitz | |
| 6,770,603 | B1 | | 8/2004 | Sawdon et al. | |
| 6,787,505 | B1 | | 9/2004 | Maitland et al. | |
| 7,032,664 | B2 | | 4/2006 | Lord et al. | |
| 7,087,555 | B2 | | 8/2006 | Halliday et al. | |
| 7,112,557 | B2 | | 9/2006 | Thaemlitz | |
| 7,244,694 | B2 | | 7/2007 | Fu et al. | |
| 7,399,731 | B2 | | 7/2008 | Jones et al. | |

(Continued)

FOREIGN PATENT DOCUMENTS

| WO | 2009-089391 A2 | 7/2009 |
| WO | 2010-106115 A1 | 9/2010 |

*Primary Examiner* — Jeffrey D Washville
(74) *Attorney, Agent, or Firm* — Mossman, Kumar & Tyler, P.C.

(57) ABSTRACT

At least one petroleum coke may be added to an oil-based fluid to improve the electrical conductivity of the oil-based fluid. The oil-based fluid may be a drilling fluid, a completion fluid, a drill-in fluid, a stimulation fluid, a servicing fluid, and combinations thereof. In a non-limiting embodiment, the downhole fluid composition may be circulated in a subterranean reservoir wellbore.

20 Claims, 2 Drawing Sheets

(56) References Cited

U.S. PATENT DOCUMENTS

| | | |
|---|---|---|
| 7,485,602 B2 | 2/2009 | Kirsner et al. |
| 7,803,740 B2 | 9/2010 | Bicerano et al. |
| 8,183,180 B2 | 5/2012 | Tour et al. |
| 8,469,118 B2 | 6/2013 | Passade-Boupat et al. |
| 8,763,695 B2 | 7/2014 | Van |
| 9,637,674 B2 | 5/2017 | Yang |
| 2009/0029878 A1 | 1/2009 | Bicerano |
| 2010/0000441 A1 | 1/2010 | Jang et al. |
| 2011/0111988 A1 | 5/2011 | Vasil et al. |
| 2012/0015852 A1* | 1/2012 | Quintero ............... C09K 8/032 507/112 |
| 2012/0103614 A1 | 5/2012 | Kalb et al. |
| 2015/0225655 A1* | 8/2015 | Adams ............... C10G 25/003 516/138 |
| 2015/0292278 A1* | 10/2015 | Wang ............... C09K 8/03 166/292 |
| 2016/0222283 A1* | 8/2016 | Cannan ............... C09K 8/805 |

* cited by examiner

ELECTRICALLY CONDUCTIVE OIL-BASED FLUIDS

CROSS-REFERENCE TO RELATED APPLICATION

This application is a divisional of U.S. Ser. No. 14/804,596 filed Jul. 21, 2015, issued May 2, 2017 as U.S. Pat. No. 9,637,674, which in turn claims the benefit of U.S. Provisional Patent Application Ser. No. 62/027,008 filed Jul. 21, 2014, incorporated herein by reference in their entirety.

TECHNICAL FIELD

The present invention relates to a fluid composition and a method for improving the electrical conductivity of an oil-based fluid that may be a drilling fluid, a completion fluid, a drill-in fluid, a stimulation fluid, and combinations thereof by adding at least one petroleum coke to the oil-based fluid.

BACKGROUND

Fluids used in the drilling, completion, stimulation, and remediation of subterranean oil and gas wells are known. It will be appreciated that within the context herein, the term "fluid" also encompasses "drilling fluids", "completion fluids", "workover fluids", "servicing fluids", "stimulation fluids", and "remediation fluids".

Drilling fluids are typically classified according to their base fluid. In water-based fluids, solid particles are suspended in a continuous phase consisting of water or brine. Oil can be emulsified in the water, which is the continuous phase. "Water-based fluid" is used herein to include fluids have an aqueous continuous phase where the aqueous continuous phase can be all water or brine, an oil-in-water emulsion, or an oil-in-brine emulsion. Brine-based fluids, of course are water-based fluids, in which the aqueous component is brine.

Oil-based fluids are the opposite or inverse of water-based fluids. "Oil-based fluid" is used herein to include fluids that are completely oil, fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally occurring materials. Synthetic-based fluids often include, but are not necessarily limited to, olefin oligomers of ethylene, esters made from vegetable fatty acids and alcohols, ethers and polyethers made from alcohols and polyalcohols, paraffinic and/or aromatic hydrocarbons, alkyl benzenes, terpenes and other natural products and mixtures of these types.

For some applications, in particular for the use of some wellbore imaging tools, it is important to reduce the electrical resistivity (which is equivalent to increasing the electrical conductivity) of the oil-based fluid as the electrical conductivity of the fluids has a direct impact on the image quality. Certain resistivity logging tools, such as high resolution LWD tool STARTRAK™, available from Baker Hughes Inc, require the fluid to be electrically conductive to obtain the best image resolution. Water-based fluids, which are typically highly electrically conductive with a resistivity less than about 100 Ohm-m, are typically preferred for use with such tools in order to obtain a high resolution from the LWD logging tool.

However, oil based fluids are preferred in certain formation conditions, such as those with sensitive shales, or high pressure high temperature (HPHT) conditions where corrosion is abundant. Oil-based fluids are a challenge to use with high resolution resistivity tool, e.g. STARTRAK™, because oil-based fluids have a low electrical conductivity (i.e. high resistivity). It would be highly desirable if fluid compositions and methods could be devised to increase the electrical conductivity of the oil-based or non-aqueous-liquid-based drilling, completion, production, and remediation fluids and thereby allow for better utilization of resistivity logging tools.

There are a variety of functions and characteristics that are expected of completion fluids. The completion fluid may be placed in a well to facilitate final operations prior to initiation of production. Completion fluids are typically brines, such as chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof.

Chemical compatibility of the completion fluid with the reservoir formation and fluids is key. Chemical additives, such as polymers and surfactants are known in the art for being introduced to the brines used in well servicing fluids for various reasons that include, but are not limited to, increasing viscosity, and increasing the density of the brine. Water-thickening polymers serve to increase the viscosity of the brines and thus retard the migration of the brines into the formation and lift drilled solids from the wellbore. A regular drilling fluid is usually not compatible for completion operations because of its solids content, pH, and ionic composition. Completion fluids also help place certain completion-related equipment, such as gravel packs, without damaging the producing subterranean formation zones. Modifying the electrical conductivity and resistivity of completion fluids may allow the use of resistivity logging tools for facilitating final operations.

A stimulation fluid may be a treatment fluid prepared to stimulate, restore, or enhance the productivity of a well, such as fracturing fluids and/or matrix stimulation fluids in one non-limiting example. Stimulation fluids typically contain an acid or a solvent.

Servicing fluids, such as remediation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations.

Before performing remedial operations, the production of the well must be stopped, as well as the pressure of the reservoir contained. To do this, any tubing-casing packers may be unseated, and then servicing fluids are run down the tubing-casing annulus and up the tubing string. These servicing fluids aid in balancing the pressure of the reservoir and prevent the influx of any reservoir fluids. The tubing may be removed from the well once the well pressure is under control. Tools typically used for remedial operations include wireline tools, packers, perforating guns, flow-rate sensors, electric logging sondes, etc.

A drill-in fluid may be used exclusively for drilling through the reservoir section of a wellbore successfully, which may be a long, horizontal drainhole. The drill-in fluid may minimize damage and maximize production of exposed zones, and/or facilitate any necessary well completion. A drill-in fluid may be a fresh water or brine-based fluid that contains solids having appropriate particle sizes (salt crystals or calcium carbonate) and polymers. Drill-in fluids may be aqueous or non-aqueous. Filtration control additives and additives for carrying cuttings may be added to a drill-in fluid.

It would be desirable if the aforementioned fluid compositions and methods for using such fluids could be tailored to improve the electrical conductivity of drilling fluids, completion fluids, stimulation fluids, drill-in fluids, and servicing fluids, and thereby enhance the performance of downhole tools, such as resistivity logging tools in one non-limiting example.

SUMMARY

There is provided, in one non-limiting form, a downhole fluid composition that includes an oil-based fluid and at least one petroleum coke in particle form. The oil-based fluid may be or include a drilling fluid, a completion fluid, a drill-in fluid, a stimulation fluid, a servicing fluid, and combinations thereof.

In an alternative embodiment of the downhole fluid composition, the petroleum coke, in particle form, may be present in the downhole fluid composition in an amount ranging from about 0.05 wt % to about 25 wt %. The downhole fluid composition may also include a surfactant in an effective amount to suspend the petroleum coke in the oil-based fluid.

In another non-limiting form, a method may include circulating a downhole fluid composition into a subterranean reservoir wellbore. The downhole fluid composition may be or include an oil-based fluid, such as drilling fluid, a completion fluid, a drill-in fluid, a stimulation fluid, a servicing fluid, and combinations thereof. The downhole fluid composition may include at least one petroleum coke in an effective amount to improve the electrical conductivity of the downhole fluid. The at least one petroleum coke is in particle form.

In an alternative form of the method, the method may include adding an effective amount of at least one petroleum coke to an oil-based fluid to form a downhole fluid composition having improved electrical properties. The oil-based fluid may be selected from the group consisting of a drilling fluid, a completion fluid, a drill-in fluid, a stimulation fluid, a servicing fluid, and combinations thereof. The at least one petroleum coke is in particle form and is present in an amount effective to improve electrical conductivity of the oil-based fluid. The method may also include adding a surfactant to the oil-based fluid in an amount effective to suspend the at least one petroleum coke in the oil-based fluid. The at least one petroleum coke and at least one surfactant may be added to the oil-based fluid in any order.

Petroleum coke appears to improve the electrical conductivity of the downhole fluid composition.

DETAILED DESCRIPTION

Figure 1:
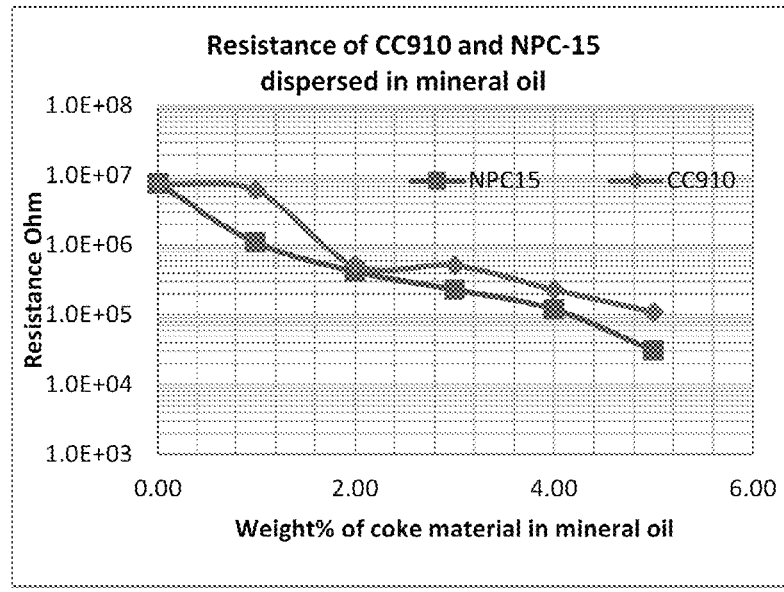
FIG. 1 is a graph illustrating the resistance measurements of two different mineral oil formulations where each resistance measurement correlates to an amount of the coke within each sample.

It has been discovered that adding at least one type of petroleum coke to an oil-based fluid may give the oil-based fluid antistatic properties by increasing the electrical conductivity of the oil-based fluid. Non-limiting examples of such oil-based fluids may be or include plastics, ink, paint, downhole fluids, and combinations thereof.

The downhole fluid composition may improve the use of a downhole tool, such as a resistivity logging tool in a non-limiting example. These tools are typically only used in aqueous fluids, e.g. water-based fluids, because resistivity-logging tools require the fluid in the wellbore to be electrically conductive. The petroleum coke and/or particles, mentioned below, may be added or dispersed into at least one phase of the oil-based fluid, such as the continuous phase in a non-limiting embodiment.

The final electrical conductivity of the downhole fluid composition may be determined by the content and the inherent properties of the dispersed phase content, which may be tailored to achieve desired values of electrical conductivity. The final resistivity (inverse of electrical conductivity) of the downhole fluid composition may range from about 0.02 ohm-m independently to about 1,000,000 ohm-m in one non-limiting embodiment. In an alternative embodiment, the resistivity may range from about 0.2 ohm-m independently to about 10,000 ohm-m, or from about 2 ohm-m independently to about 1,000 ohm-m. Achieving this range of electrical conductivity within an oil-based fluid represents a decrease of 6-9 orders of magnitude as compared with the electrical conductivity of typical oil-based fluids absent the petroleum coke. As used herein with respect to a range, "independently" means that any threshold may be used together with another threshold to give a suitable alternative range, e.g. about 0.02 ohm-m independently to about 0.2 ohm-m is also considered a suitable alternative range.

The petroleum coke may be present in the downhole fluid composition in an amount effective to improve the performance of a downhole tool as compared to an otherwise identical fluid absent the petroleum coke. Alternatively, the amount of the petroleum coke within the total downhole fluid composition may range from about 0.05 wt % independently to about 25 wt % based on the total fluid composition, or from about 1 wt % independently to about 10 wt % in another non-limiting embodiment. The average particle size of the petroleum coke particles may range from about 10 nm independently to about 1,000 microns, alternatively from about 500 nm independently to about 500 microns, or from about 1 micron independently to about 100 microns in another non-limiting embodiment.

In a non-limiting embodiment, the petroleum coke may be or include calcined petroleum coke, green coke, anode-grade coke, coke treated with a metallic salt, and combinations thereof. Petroleum coke (also referred to as pet coke or petcoke) is a carbonaceous solid derived from oil refinery coker units or other cracking processes. Petroleum coke may also be derived from coal. The raw coke or unprocessed coke is known as green coke, which may come directly from a coker unit. The green coke may be further processed by removing moisture and/or residual volatile hydrocarbons from the coke, which is also known as 'calcining' the coke, and process coke via this method is known as calcined coke. One method of calcining involves a rotary kiln in a non-limiting embodiment. The calcined petroleum coke may be further processed to produce needle or anode coke having desired shape and physical properties.

In a non-limiting embodiment, the petroleum coke within the downhole fluid composition is calcined coke; alternatively, the petroleum coke within the downhole fluid composition is a combination of calcined coke, green coke, anode-grade coke, and/or coke treated with a metallic salt. The calcined petroleum coke and/or anode grade coke may improve the electrical conductivity of the downhole fluid, while the green coke and/or metallic salt treated coke may aid in controlling fluid loss, act as an anti-seepage additive, may act as a lubricant, or lost circulation material, and combinations thereof.

In an alternative embodiment, the petroleum coke may be treated with a metallic salt. The metallic salt treatment may occur by spraying a metallic salt solution onto the petroleum coke prior to the calcining process of the coke. The metal portion of the salt may be or include, but is not limited to iron, magnesium, titanium, molybdenum, nickel, manganese, and combinations thereof. Such salts may be or include, but are not limited to metal halides, metal nitrites, metal sulfates, metal oxides, quaternary ammonium salts (e.g. tetraalkyl ammonium halides in a non-limiting embodiment), metal nitrates, metal sulfonates, and combinations thereof. The amount of metal present in the metallic salt solution may range from about 0.01 wt % independently to about 5 wt %, or from about 0.1 wt % independently to about 1 wt %. In a non-limiting embodiment, the metallic salt treated coke may be an additive to the oil-based fluid to improve a property, such as but not limited to anti-seepage, lost circulation or fluid loss, decreasing sulfur species present in the oil-based fluid, and combinations thereof.

In a non-limiting embodiment, the downhole fluid composition may include carbon black agglomerates, carbon black nanoparticles, and combinations thereof; unless otherwise specified, 'carbon black' refers to both carbon black nanoparticles and micron-sized carbon black particles. Carbon black may be or include acetylene black, channel black, furnace black, lamp black, thermal black, and the like. Carbon black is a material produced by the incomplete combustion of heavy petroleum products, such as but not limited to, FCC tar, coal tar, ethylene cracking tar, vegetable oil, and combinations thereof. Carbon black has a high surface-area-to-volume ratio because of its paracrystalline carbon structure.

In another non-limiting embodiment, the downhole fluid composition may include a second type of nanoparticles different from the carbon black nanoparticles, such as but not limited to, graphite nanoparticles, graphene nanoparticles, graphene platelets, fullerenes, nanotubes, nanorods, nanoplatelets, and combinations thereof. In a non-limiting embodiment, the combination of the petroleum coke, carbon black, and/or second nanoparticles, may synergistically improve the electrical conductivity of the downhole fluid.

'Second nanoparticles' are defined herein to be nanoparticles that are different from the carbon black nanoparticles; however, the second nanoparticles may be present in the downhole fluid composition in the absence of carbon black nanoparticles. Said differently, the notation of 'second' does not imply that the second nanoparticles are added to the fluid after something else has been added to the fluid 'first', for example, the second nanoparticles may be added to the fluid as the first additive, or the only additive.

The second nanoparticles may be or include nanotubes, nanorods, fullerenes, graphene, graphite nanoparticles, nanoplatelets, and combinations thereof. In a non-limiting embodiment, the second nanoparticles are electrically conductive. In another non-limiting embodiment, the nanotubes, nanorods, and/or nanoplatelets may be metallic, ceramic, or combinations thereof in an alternative embodiment. In one non-limiting embodiment, the nanotubes are carbon nanotubes. The amount of second nanoparticles within the downhole fluid composition may range from about 0.0001 wt % independently to about 15 wt % to modify the electrical conductivity of the fluid. In a non-limiting embodiment, the second nanoparticles may be added in an amount ranging from about 0.001 wt % independently to about 5 wt %, alternatively from about 0.01 wt % independently to about 1 wt %.

The second nanoparticles may be functionally modified by a mechanism to form a functionalized nanoparticle. In a non-limiting embodiment, the functional modification improves the electrical conductivity of the second nanoparticles. The functional modification may be or include, but is not limited to a chemical modification, a covalent modification, a physical modification, a surface modification, and combinations thereof. Thus, 'functionalized nanoparticles' are defined herein to be the nanoparticle having an increased or decreased functionality, and the 'functional modification' is the process by which the nanoparticle has had a particular functionality added, increased or decreased. The functionalized nanoparticles may have different functionalities than nanoparticles that have not been functionally modified. In a non-limiting embodiment, the functional modification of the second nanoparticles may improve the dispersibility of the second nanoparticles in an oil-based fluid by stabilizing the second nanoparticles in suspension, which avoids undesirable flocculation as compared with otherwise identical second nanoparticles that have not been functionally modified. In one non-limiting embodiment of the invention, it is desirable that the conductivity properties of the fluid be uniform, which requires the distribution of the second nanoparticles and/or carbon black to be uniform. If the second nanoparticles and/or carbon black flocculate, drop out, or precipitate, the electrical conductivity of the fluid may change.

Graphene is an allotrope of carbon having a planar sheet structure that has $sp^2$-bonded carbon atoms densely packed in a 2-dimensional honeycomb crystal lattice. The term "graphene" is used herein to include particles that may contain more than one atomic plane, but still with a layered morphology, i.e. one in which one of the dimensions is significantly smaller than the other two, and also may include any graphene that has been functionally modified. The structure of graphene is hexagonal, and graphene is often referred to as a 2-dimensional (2-D) material. The 2-D morphology of the graphene nanoparticles is of utmost importance when carrying out the useful applications relevant to the graphene nanoparticles. The applications of graphite, the 3-D version of graphene, are not equivalent to the 2-D applications of graphene. The graphene may have at least one graphene sheet, and each graphene platelet may have a thickness no greater than 100 nm.

Graphene is in the form of one-atomic layer thick or multi-atomic layer thick platelets. Graphene platelets may have in-plane dimensions ranging from sub-micrometer to about 100 micrometers. This type of platelet shares many of the same characteristics as carbon nanotubes. The platelet chemical structure makes it easier to functionally modify the platelet for enhanced dispersion in polymers. Graphene platelets provide electrical conductivity that is similar to copper, but the density of the platelets may be about four times less than that of copper, which allows for lighter materials. The graphene platelets may also be fifty (50) times stronger than steel with a surface area that is twice that of carbon nanotubes.

Graphene may form the basis of several nanoparticle types, such as but not limited to the graphite nanoparticle, nanotubes, fullerenes, and the like. Several graphene sheets layered together may form a graphite nanoparticle. In a non-limiting embodiment, a graphite nanoparticle may have from about 2 layered graphene sheets independently to about 20 layered graphene sheets to form the graphite nanoparticle, or from about 3 layered graphene sheets independently to about 25 layered graphene sheets in another non-limiting example. Graphite nanoparticles may range from about 1 independently to about 50 nanometers thick, or from about 3 nm independently to about 25 nm thick. The graphite nanoparticle diameter may range from about sub-micrometer independently to about 100 micrometers.

Graphite nanoparticles are graphite (natural or synthetic) species downsized into a submicron size by a process, such as but not limited to a mechanic milling process to form graphite platelets, or a laser ablating technique to form a graphite nanoparticle having a spherical structure. The spherical structure may range in size from about 30 nm independently to about 1000 nm, or from about 50 nm independently to about 500 nm. In a non-limiting embodiment, the graphite platelets may have a 2D structure; whereas, the spherical graphite nanoparticles may have a 3D structure. Graphite nanoparticles have different chemical properties because of the layered graphene effect, which allows them to be more electrically conductive than a single graphene sheet.

In another non-limiting embodiment, the graphene sheet may form a substantially spherical structure having a hollow inside, which is known as a fullerene. Such a cage-like structure allows a fullerene to have different properties or features as compared to graphite nanoparticles or graphene nanoparticle. For the most part, fullerenes are stable structures, but a non-limiting characteristic reaction of a fullerene is an electrophilic addition at 6,6 double bonds to reduce angle strain by changing a $sp^2$-hydridized carbons into a $sp^3$-hybridized carbon. In another non-limiting example, fullerenes may have other atoms trapped inside the hollow portion of the fullerene to form an endohedral fullerene. Metallofullerenes are non-limiting examples where one or two metallic atoms are trapped inside of the fullerene, but are not chemically bonded within the fullerene. Although fullerenes are not electrically conductive alone, a functional modification to the fullerene may enhance a desired property thereto. Such functional modifications include, but are not necessarily limited to, chemical modifications, physical modifications, covalent modifications, and/or surface modifications to form a functionalized fullerene.

In another non-limiting embodiment, the graphene sheet may form a cylindrical sheet, which is known as a carbon nanotube or cylindrical fullerenes. Carbon nanotubes are defined herein as allotropes of carbon consisting of one or several single-atomic layers of graphene rolled into a cylindrical nanostructure. Nanotubes may be single-walled, double-walled or multi-walled; nanotubes may also be open-ended or closed-ended. Nanotubes have high tensile strength, high electrical conductivity, high ductility, high heat conductivity, and relative chemical inactivity such that there are no exposed atoms that may be easily displaced.

Electrical conductivity properties of graphene have been measured and compare well with those of carbon nanotubes. The 2-D morphology, however, provides significant benefits when dispersed in complex fluids, such as multi-phasic fluids or emulsions. Unique to this application is the engineering of the graphene dispersion within the non-conducting phase of the fluid, to achieve the desired properties.

In the present context, the second nanoparticles may have at least one dimension less than 50 nm, although other dimensions may be larger than this. In a non-limiting embodiment, the second nanoparticles may have one dimension less than 30 nm, or alternatively less than 10 nm. In one non-limiting instance, the smallest dimension of the second nanoparticles may be less than 5 nm, but the length of the second nanoparticles may be much longer than 100 nm, for instance 25,000 nm or more. Such second nanoparticles would be within the scope of the fluids herein.

Second nanoparticles typically have at least one dimension less than 100 nm (one hundred nanometers). While materials on a micron scale have properties similar to the larger materials from which they are derived, assuming homogeneous composition, the same is not true of second nanoparticles. An immediate example is the very large interfacial or surface area per volume for second nanoparticles. The consequence of this phenomenon is a very large potential for interaction with other matter, as a function of volume. For second nanoparticles, the surface area may be up to 1800 $m^2/g$. Additionally, because of the very large surface area to volume present with graphene, it is expected that in most, if not all cases, much less proportion of graphene nanoparticles need be employed relative to micron-sized additives conventionally used to achieve or accomplish a similar effect.

Nevertheless, it should be understood that surface-modified second nanoparticles to form a surface-modified functionalized nanoparticle, which may find utility in the compositions and methods herein. "Surface-modification" is defined here as the process of altering or modifying the surface properties of a particle by any means, including but not limited to physical, chemical, electrochemical or mechanical means, and with the intent to provide a unique desirable property or combination of properties to the surface of the nanoparticle, which differs from the properties of the surface of the unprocessed nanoparticle.

The second nanoparticles may be functionally modified to introduce chemical functional groups thereon, for instance by reacting the graphene nanoparticles with a peroxide such as diacyl peroxide to add acyl groups which are in turn reacted with diamines to give amine functionality, which may be further reacted. Functionalized second nanoparticles are defined herein as those which have had their edges or surfaces functionally modified to contain at least one functional group including, but not necessarily limited to, sulfonate, sulfate, sulfosuccinate, thiosulfate, succinate, carboxylate, hydroxyl, glucoside, ethoxylate, propoxylate, phosphate, ethoxylate, ether, amines, amides, ethoxylate-propoxylate, an alkyl, an alkenyl, a phenyl, a benzyl, a perfluoro, thiol, an ester, an epoxy, a keto, a lactone, a metal, an organo-metallic group, an oligomer, a polymer, or combinations thereof.

Introduction of functional groups by derivatizing the olefinic functionality associated with the second nanoparticles may be effected by any of numerous known methods for direct carbon-carbon bond formation to an olefinic bond, or by linking to a functional group derived from an olefin. Exemplary methods of functionally modifying may include, but are not limited to, reactions such as oxidation or oxidative cleavage of olefins to form alcohols, diols, or carbonyl groups including aldehydes, ketones, or carboxylic acids; diazotization of olefins proceeding by the Sandmeyer reaction; intercalation/metallization of a nanodiamond by treatment with a reactive metal such as an alkali metal including lithium, sodium, potassium, and the like, to form an anionic intermediate, followed by treatment with a molecule capable of reacting with the metalized nanodiamond such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of transmetalated species with boron, zinc, or tin groups which react with e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, and combinations thereof.

Covalent modification may include, but is not necessarily limited to, oxidation and subsequent chemical modification of oxidized second nanoparticles, fluorination, free radical additions, addition of carbenes, nitrenes and other radicals, arylamine attachment via diazonium chemistry, and the like. Besides covalent modification, chemical modification may occur by introducing noncovalent functionalization, electrostatic interactions, π-π interactions and polymer interactions, such as wrapping a nanoparticle with a polymer, direct attachment of reactants to second nanoparticles by attacking the $sp^2$ bonds, direct attachment to ends of second nanoparticles or to the edges of the second nanoparticles, and the like.

It will be appreciated that the above methods are intended to illustrate the concept of functionally modifying the nanoparticles to introduce functional groups to a second nanoparticle, and should not be considered as limiting to such methods.

Prior to functional modification, the second nanoparticle may be exfoliated. Exemplary exfoliation methods include, but are not necessarily limited to, those practiced in the art, including but not necessarily limited to, fluorination, acid intercalation, acid intercalation followed by thermal shock treatment, and the like. Exfoliation of the graphene provides a graphene having fewer layers than non-exfoliated graphene.

The effective medium theory states that properties of materials or fluids comprising different phases can be estimated from the knowledge of the properties of the individual phases and their volumetric fraction in the mixture. In particular if a conducting particle is dispersed in a dielectric fluid, the electrical conductivity of the dispersion will slowly increase for small additions of second nanoparticles. As petroleum coke and optional second nanoparticles are continually added to the dispersion, the conductivity of the fluid increases, i.e. there is a strong correlation between increased conductivity and increased concentration of petroleum coke and optional second nanoparticles. In general, this concentration is often referred to as the percolation limit.

In the case of electrical conductivity, conductivity of nanofluids (i.e. dispersion of second nanoparticles in fluids), the percolation limit decreases with decreasing the size of the second nanoparticles. Generally, this dependence of the percolation limit on the concentration of the second nanoparticles holds for other fluid properties that depend on inter-particle average distance.

There is also a strong dependence on the shape of the second nanoparticles dispersed within the phases for the percolation limit of nano-dispersions. The percolation limit shifts further towards lower concentrations of the dispersed phase if the second nanoparticles have characteristic 2-D (platelets) or 1-D (nanotubes or nanorods) morphology. Thus the amount of 2-D or 1-D second nanoparticles necessary to achieve a certain change in property is significantly smaller than the amount of 3-D second nanoparticles that would be required to accomplish a similar effect.

In one sense, such fluids have made use of second nanoparticles for many years, since the clays commonly used in drilling fluids are naturally-occurring, 1 nm thick discs of aluminosilicates. Such second nanoparticles exhibit extraordinary rheological properties in water and oil. However, in contrast, the second nanoparticles that are the main topic herein are synthetically formed second nanoparticles where size, shape and chemical composition are carefully controlled and give a particular property or effect.

The fluids herein may contain petroleum coke, optional carbon black, and optional second nanoparticles to improve the electrical conductivity of the fluids. In some cases, the second nanoparticles may change the properties of the fluids in which they reside, based on various stimuli including, but not necessarily limited to, temperature, pressure, rheology, pH, chemical composition, salinity, and the like. This is due to the fact that the second nanoparticles can be custom designed on an atomic level to have very specific functional groups, and thus the second nanoparticles react to a change in surroundings or conditions in a way that is beneficial. It should be understood that it is expected that second nanoparticles may have more than one type of functional group, making them multifunctional. Multifunctional second nanoparticles may be useful for simultaneous applications, in a non-limiting example of a fluid, lubricating the drill bit, increasing the temperature stability of the fluid, stabilizing the shale while drilling and provide low shear rate viscosity. In another non-restrictive embodiment, second nanoparticles suitable for stabilizing shale include those having an electric charge that permits them to associate with the shale.

Although the inventors do not wish to be bound to a particular theory, it is thought that capping the second nanoparticles, in a non-limiting embodiment, may decrease the oxygen reactivity of the second nanoparticles by capping at least one oxygen species of the second nanoparticles. In another non-limiting embodiment, the oxygen species that may be capped include, but are not limited to carboxylic acids, ketones, lactones, anhydrides, hydroxyls, and combinations thereof. The second nanoparticles may be functionalized nanoparticles or non-functionalized nanoparticles prior to capping the second nanoparticles. In some non-limiting embodiments, the second nanoparticles may be functionally modified to form functionalized nanoparticles, and capping the functionalized second nanoparticles may result in a second nanoparticle having a semi-muted functionalization. Said differently, the second functionalized nanoparticle may still maintain some of the functionalized characteristics, but to a lesser extent than a fully functionalized second nanoparticle that has not been capped. One skilled in the art would recognize when to cap or not cap a functionalized or non-functionalized second nanoparticle.

The second nanoparticles may be capped by a method, such as but not limited to, physical capping, chemical capping, and combinations thereof. The second nanoparticles may or may not be functionally modified prior to capping the second nanoparticles. A physical capping may occur by altering the ability of the oxygen species to decrease/eliminate electrostatic interactions, ionic interactions, physical absorption of the oxygen species, and the like. In non-limiting examples, metal carbonyl species may be used to aid in physically capping the nanoparticles, such as but not limited to platinum carbonyls, gold carbonyls, silver carbonyls, copper carbonyls, and combinations thereof. In an alternative non-limiting embodiment, metal nanoparticles may be used for physically capping the second nanoparticles, such as but not limited to platinum nanoparticles, gold nanoparticles, silver nanoparticles, copper nanoparticles, and combinations thereof.

A chemical capping may occur by modifying chemical bonds of the second nanoparticles to alter the oxygen reactivity of the nanoparticles, chemical absorption of the oxygen species, and the like. A non-limiting example of a chemical capping may include altering the polarity of an oxygen species of the second nanoparticle to be a non-polar or less polar oxygen species. Other non-limiting examples of chemical capping may occur by performing a reaction with the oxygen species, such as but not limited to a Grignard reaction, an alkyl esterification, an amidation, silanation with organic silanes, and combinations thereof.

In another non-limiting embodiment, the downhole fluid composition may include a surfactant in an amount effective to suspend the petroleum coke, optional carbon black, and optional second nanoparticles in the downhole fluid. The surfactant may be present in the downhole fluid composition in an amount ranging from about 1 vol % independently to about 10 vol %, or from about 2 vol % independently to about 8 vol % in another non-limiting embodiment.

The use of optional surfactants together with the petroleum coke, optional carbon black, and optional second nanoparticles may form self-assembly structures that may enhance the thermodynamic, physical, and rheological properties of these types of fluids. The petroleum coke, optional carbon black, and optional second nanoparticles are dispersed in the oil-based fluid. The base fluid may be a non-aqueous fluid that may be a single-phase fluid or a poly-phase fluid, such as an emulsion of water-in-oil (W/O). The petroleum coke, optional carbon black, and optional second nanoparticles may be used in conventional operations and challenging operations that require stable fluids for high temperature and pressure conditions (HTHP).

Expected suitable surfactants may include, but are not necessarily limited to non-ionic, anionic, cationic, amphoteric surfactants and zwitterionic surfactants, janus surfactants, and blends thereof. Suitable nonionic surfactants may include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants may include alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants may include, but are not necessarily limited to, arginine methyl esters, alkanolamines and alkylenediamides. Suitable surfactants may also include surfactants containing a non-ionic spacer-arm central extension, and an ionic or nonionic polar group. Other suitable surfactants may be dimeric or gemini surfactants, cleavable surfactants, janus surfactants and extended surfactants, also called extended chain surfactants.

In one non-restrictive version, the average nanoparticle length for the second nanoparticles to aid the petroleum coke and optional carbon black in improving the electrical conductivity properties may range from about 1 nm independently to about 10,000 nm, alternatively from about 10 nm independently to about 1000 nm. Enhanced electrical conductivity of the fluids may form an electrically conductive filter cake that highly improves real time high resolution logging processes, as compared with an otherwise identical fluid absent the petroleum coke and optional second nanoparticles.

In one non-limiting embodiment, the downhole fluid composition may include the oil-based fluid, and the petroleum coke; but in the absence of the optional carbon black, the optional second nanoparticles and/or the optional surfactant. The petroleum coke may be calcined petroleum coke, green coke, and/or anode-grade coke as mentioned above. In another non-limiting embodiment, the downhole fluid composition may include the oil-based fluid, the petroleum coke, and an optional surfactant; but in the absence of the optional carbon black, and the optional second nanoparticles. Alternatively, the downhole fluid composition may include the oil-based fluid, the petroleum coke, and optional second nanoparticles that may be capped or not capped; but in the absence of the optional surfactant, and the optional carbon black. In yet another non-limiting embodiment, the downhole fluid composition may include the oil-based fluid, the petroleum coke, the optional surfactant, and the optional second nanoparticles that may be capped or not capped; but in the absence of the optional carbon black. In another alternative non-limiting embodiment, the downhole fluid composition may include the oil-based fluid, the petroleum coke, the optional surfactant, the optional second nanoparticles, and the optional carbon black (nanoparticle or not).

The downhole fluid composition may be circulated into a subterranean reservoir wellbore where the downhole fluid comprises the oil-based fluid, the petroleum coke, the optional surfactant, the optional carbon black, and/or the optional second nanoparticles. A downhole tool may be operated with the downhole fluid composition at the same time or different time as the circulating of the downhole fluid. The downhole tool may have or provide an improved image as compared to a downhole tool being operated at the same time or different time as a downhole fluid absent the petroleum coke.

Other benefits that may arise from modifying the electrical conductivity of the downhole fluids may include enabling the implementation of measuring tools based on resistivity with superior image resolution, and improving the ability of a driller to improve its efficiency in the non-limiting instance of drilling fluids and/or completion fluids. It may also be conceivable that an electric signal may be able to be carried through the downhole fluids across longer distances, such as across widely spaced electrodes in or around the bottom-hole assembly, or even from the bottom of the wellbore to intermediate stations or the surface of the well.

The invention will be further described with respect to the following Examples, which are not meant to limit the invention, but rather to further illustrate the various embodiments.

EXAMPLES

Example 1

FIG. 1 is a graph illustrating the resistance measurements of two different mineral oil formulations where each resistance measurement correlates to an amount of coke within each sample. Sample 1 had NPC15 coke (supplied by Asbury Carbon), and Sample 2 had CC910 coke (supplied by Oxbow Corporation). The amount of each type of coke within the mineral oil is noted on the x-axis in FIG. 1. The mineral oil for sample 1 and sample 2 was ESCAID 110™. As noted by the graph, Sample 1 had the lowest resistance regardless of the amount of coke within the sample.

Example 2

Figure 2:
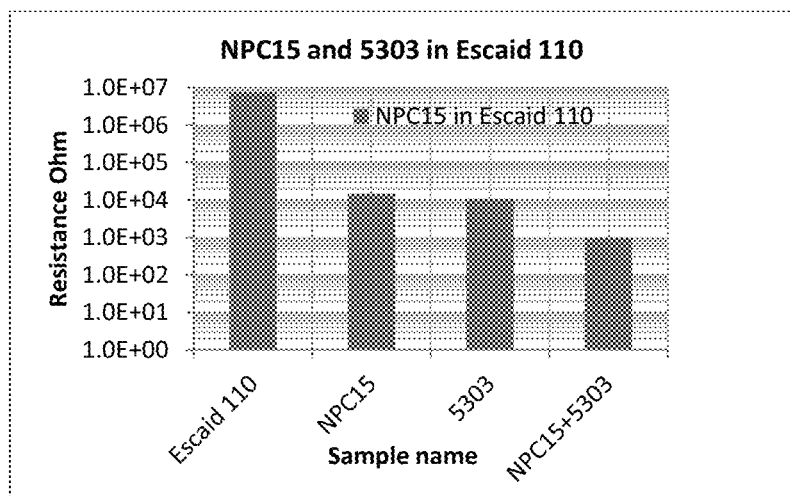
FIG. 2 is a graph illustrating the resistance measurements of four different mineral oil formulations where each formulation has a different type and/or amount of coke therein.

FIG. 2 is a graph illustrating the resistance measurements of four different mineral oil formulations where each formulation has a different type and/or amount of coke therein. Samples 1-4 appear left to right in FIG. 2. The mineral oil for Samples 1-4 is ESCAID 110™. Sample 1 has no coke added thereto; Sample 2 had 6 wt % NPC15 added thereto; Sample 3 had 0.5 wt % of a carbon black (5303) added thereto; and Sample 4 had 6 wt % NPC15 and 0.5 wt % carbon black added thereto. As noted in FIG. 2, Samples 2 and 3 had about the same resistivity measurements, which was about a decrease of three orders of magnitude as compared to Sample 1. However, FIG. 4 had a decrease of about 4 orders of magnitude as compared to Sample 1.

Example 3

Figure 3:
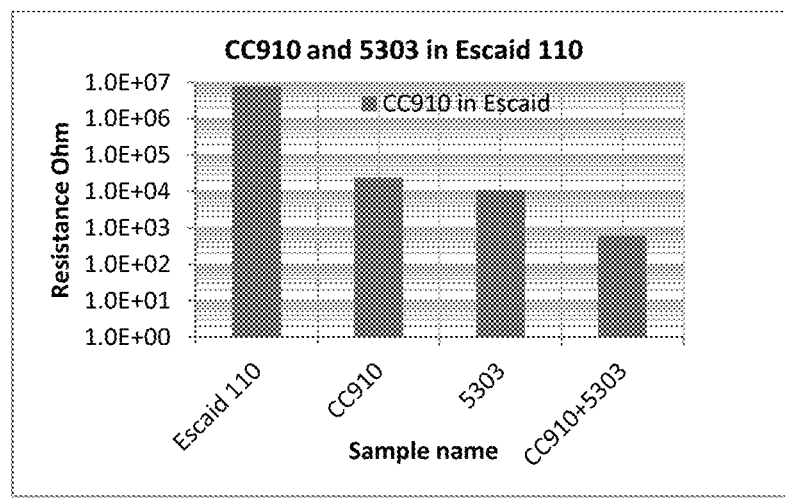
FIG. 3 is a graph illustrating the resistance measurements of four different mineral oil formulations where each formulation has a different type and/or amount of coke therein.

FIG. 3 is a graph illustrating the resistance measurements of four different mineral oil formulations where each formulation has a different type and/or amount of coke therein. Samples 1-4 appear left to right in FIG. 3. The mineral oil for Samples 1-4 is ESCAID 110™. Sample 1 has no coke added thereto; Sample 2 had 6 wt % CC910 added thereto; Sample 3 had 0.5 wt % of a carbon black added thereto; and Sample 4 had 6 wt % CC910 and 0.5 wt % carbon black added thereto. As noted in FIG. 2, Sample 2 and 3 had about the same resistivity measurements, which was about a decrease of three orders of magnitude as compared to Sample 1. However, Sample 4 had a decrease of about 4 orders of magnitude as compared to Sample 1.

Example 4

A mud was formulated having 165 grams (g) of ESCAID 110™ mineral oil, 4 g CARBO-GEL™, 12 g of a nonionic surfactant, 92 g of calcium chloride brine, and 211 g MIL-BAR™. No coke was added to the formulation. The oil/water ratio of the mud formulation was 75:25. The resistance was measured at 1.2 E+6 Ohm @1 k Hz.

Example 5

A mud was formulated having 20 ppb CC910 coke material, 165 grams (g) of ESCAID 110™ mineral oil, 4 g CARBO-GEL™, 12 g of a nonionic surfactant, 92 g of calcium chloride brine, 211 g MIL-BAR™, and 20 g of calcinated coke. The oil/water ratio of the mud formulation was 75:25. The resistance was measured at 1.7 E+4 Ohm @1 k Hz. 2 g of carbon black was then added to the mud formulation, and the resistance was measured a second time at 6.2 E+3 Ohm @1 k Hz.

Example 6

A mud was formulated having 20 ppb NPC15 coke material, 165 grams (g) of ESCAID 110™ mineral oil, 4 g CARBO-GEL™, 12 g of a nonionic surfactant, 92 g of calcium chloride brine, 211 g MIL-BAR™, and 20 g of calcinated coke. The oil/water ratio of the mud formulation was 75:25. The resistance was measured at 2.7 E+4 Ohm @1 k Hz @1 k Hz. 1 g of carbon black was then added to the mud formulation, and the resistance was measured a second time at 2.2 E+3 Ohm @1 k Hz.

The resistance of the mineral oil formulations in Examples 1-6 were measured by an impedance meter under the same conditions at 1 k Hz and room temperature. The coke material showed a dose-dependent response that correlated to the resistance measurements.

In the foregoing specification, the invention has been described with reference to specific embodiments thereof, and has been suggested as effective in providing effective downhole fluid compositions and methods for improving the electrical conductivity of a downhole fluid composition. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and/or reaction conditions for forming the petroleum coke and/or the second nanoparticles, whether modified to have particular shapes or certain functional groups thereon, but not specifically identified or tried in a particular oil-based fluid to improve the properties therein, are anticipated to be within the scope of this invention.

The present invention may suitably comprise, consist or consist essentially of the elements disclosed and may be practiced in the absence of an element not disclosed. For instance, the downhole fluid composition may consist of or consist essentially of an oil-based fluid and at least one petroleum coke in particle form; the oil-based fluid may be or include a drilling fluid, a completion fluid, a drill-in fluid, a stimulation fluid, a servicing fluid, and combinations thereof. The amount of the at least one petroleum coke is effective to improve the electrical conductivity of the downhole fluid.

The method may consist of or consist essentially of circulating a downhole fluid composition into a subterranean reservoir wellbore where the downhole fluid composition may be or include an oil-based fluid, such as drilling fluid, a completion fluid, a drill-in fluid, a stimulation fluid, a servicing fluid, and combinations thereof; the downhole fluid composition may include at least one petroleum coke in an effective amount to improve the electrical conductivity of the downhole fluid, and the at least one petroleum coke is in particle form.

The words "comprising" and "comprises" as used throughout the claims is to be interpreted as meaning "including but not limited to".

What is claimed is:

1. A method comprising:
 circulating a downhole fluid composition into a subterranean reservoir wellbore; wherein the downhole fluid composition comprises an oil-based emulsion; and wherein the downhole fluid composition comprises at least one petroleum coke in an effective amount to improve the electrical conductivity of the downhole fluid, and the at least one petroleum coke is in particle form, wherein the at least one petroleum coke has been treated with a metallic salt selected from the group consisting of metal halides, metal nitrites, quaternary ammonium salts, metal nitrates, and combinations thereof.

2. The method of claim 1, further comprising adding the at least one petroleum coke to the oil-based emulsion prior to circulating the downhole fluid composition.

3. The method of claim 1, further comprising operating a downhole tool at the same time or different time as circulating the downhole fluid composition.

4. The method of claim 1, wherein the amount of the at least one petroleum coke ranges from about 0.05 wt % to about 25 wt % based on the total fluid composition.

5. The method of claim 1, wherein the size of the at least one petroleum coke particles ranges from about 10 nm to about 1,000 microns.

6. The method of claim 1, where the downhole fluid composition further comprising particles selected from the group consisting of carbon black particles, second nanoparticles, and combinations thereof.

7. The method of claim 1 where the downhole fluid composition is made by a process comprising in any order:
 adding an effective amount of at least one petroleum coke in particle form to an oil-based emulsion to form a downhole fluid composition having improved electrical conductivity; wherein he at least one petroleum coke is in particle form; and
 adding at least one surfactant to the oil-based emulsion in an amount effective to suspend the at least one petroleum coke in the oil-based fluid.

8. The method of claim 1 where the method improves electrical conductivity of the downhole fluid composition by a decrease in resistivity from 3 to 9 orders of magnitude.

9. The method of claim 1 where the oil-based emulsion is a water-in-oil emulsion.

10. The method of claim 1 where the oil-based emulsion is a stable emulsion.

11. A method comprising:
 circulating a downhole fluid composition into a subterranean reservoir wellbore; wherein the downhole fluid composition comprises an oil-based emulsion; and wherein the downhole fluid composition comprises at least one petroleum coke in an effective amount to improve the electrical conductivity of the downhole fluid, and the at least one petroleum coke is in particle form, wherein the at least one petroleum coke has been treated with a metallic salt selected from the group consisting of metal halides, metal nitrites, quaternary ammonium salts, metal nitrates, and combinations thereof,
 wherein:
  the amount of the at least one petroleum coke ranges from about 0.05 wt % to about 25 wt % based on the total fluid composition, and
  the size of the at least one petroleum coke particles ranges from about 10 nm to about 1,000 microns.

12. The method of claim 11, further comprising adding the at least one petroleum coke to the oil-based emulsion prior to circulating the downhole fluid composition.

13. The method of claim 11, further comprising operating a downhole tool at the same time or different time as circulating the downhole fluid composition.

14. The method of claim 11, wherein the at least one petroleum coke is calcined petroleum coke.

15. The method of claim 11 where the oil-based emulsion is a water-in-oil emulsion.

16. The method of claim 15 where the oil-based emulsion is a stable emulsion.

17. A method comprising:
 circulating a downhole fluid composition into a subterranean reservoir wellbore; wherein the downhole fluid composition comprises an oil-based emulsion; and wherein the downhole fluid composition comprises at least one petroleum coke in an effective amount to improve the electrical conductivity of the downhole fluid, and the at least one petroleum coke is calcined petroleum coke and is in particle form, wherein the at least one petroleum coke has been treated with a metallic salt selected from the group consisting of metal halides, metal nitrites, quaternary ammonium salts, metal nitrates, and combinations thereof.

18. The method of claim 1, wherein the size of the at least one petroleum coke particles ranges from about 10 nm to about 100 microns.

19. The method of claim 11, wherein the size of the at least one petroleum coke particles ranges from about 10 nm to about 100 microns.

20. The method of claim 17, wherein the size of the at least one petroleum coke particles ranges from about 10 nm to about 100 microns.

* * * * *